(12) United States Patent
Cabrera et al.

(10) Patent No.: US 7,451,211 B2
(45) Date of Patent: Nov. 11, 2008

(54) MESSAGE EXCHANGE PATTERN TRACKING TO AVOID INVALID MESSAGE EXCHANGE

(75) Inventors: Luis Felipe Cabrera, Bellevue, WA (US); George P. Copeland, Redmond, WA (US); Steven E. Lucco, Bellevue, WA (US); Bradford Lovering, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1091 days.

(21) Appl. No.: 10/763,364

(22) Filed: Jan. 23, 2004

(65) Prior Publication Data

US 2005/0198148 A1 Sep. 8, 2005

(51) Int. Cl.
G06F 15/173 (2006.01)
G06F 15/16 (2006.01)

(52) U.S. Cl. ........................ 709/224; 709/206
(58) Field of Classification Search ......... 709/203–207, 709/217–224
See application file for complete search history.

(56) References Cited

U.S. PATENT DOCUMENTS

| | | | | |
|---|---|---|---|---|
| 5,557,798 | A | | 9/1996 | Skeen et al. ............... 395/650 |
| 7,010,790 | B2 | * | 3/2006 | Marsot et al. ............... 718/105 |
| 7,028,228 | B1 | * | 4/2006 | Lovy et al. .................... 714/57 |
| 7,146,422 | B1 | * | 12/2006 | Marlatt et al. ............... 709/227 |
| 7,194,529 | B2 | * | 3/2007 | Kupiec et al. ............... 709/223 |
| 7,249,195 | B2 | * | 7/2007 | Panec et al. .................. 709/238 |
| 2003/0061361 | A1 | * | 3/2003 | Bacik et al. .................. 709/228 |
| 2005/0108384 | A1 | * | 5/2005 | Lambert et al. ............. 709/224 |

OTHER PUBLICATIONS

Efficient Message Dispatch in Object-Oriented Systems, Mayur Naik and Rejeev Kumar, Mar. 2000, p. 49-58, ACM SIGPLAN.

Cybernetics and Systems-Towards a Unified Messaging Environment Over the Internet, Leonard Chong, Siu Cheung Hui and Chai Kiat Yeo, 1999, p. 533-549.

ECOOP '95 Object-Oriented Programming Message Dispatch on Pipelined Processors, Karel Driesen, Urs Holzle and Jan Vitek, 1995, p. 252-282.

* cited by examiner

Primary Examiner—Yasin M Barqadle
(74) Attorney, Agent, or Firm—Workman Nydegger

(57) ABSTRACT

Mechanisms for enforcing a message exchange pattern. When two computing systems communicate in order to accomplish a particular task, they engage in a particular message exchange pattern. Given certain progress through the message exchange pattern, the message exchange pattern may restrict which computing system may send what kind of messages. Each computing system tracks progress through the message exchange pattern by, for example, using a state transition tree in which each node represents a state of the message exchange pattern, and in which transmission or receipt of certain messages may cause state transitions. A computing system then only transmits messages if appropriate given the current tracked progress through the message exchange pattern.

28 Claims, 4 Drawing Sheets

MESSAGE EXCHANGE PATTERN TRACKING TO AVOID INVALID MESSAGE EXCHANGE

BACKGROUND OF THE INVENTION

1. The Field of the Invention

The present invention relates to networking technologies; and more specifically, to the tracking of progress through a message exchange pattern to thereby avoid the exchange of messages that are invalid given the tracked progress in the message exchange pattern.

2. Background and Related Art

Computing technology has transformed the way we work and play. Computing systems now take a wide variety of forms including desktop computers, laptop computers, tablet PCs, Personal Digital Assistants (PDAs), and the like. Even household devices (such as refrigerators, ovens, sewing machines, security systems, and the like) have varying levels of processing capability and thus may be considered computing systems.

Much of the functionality provided by computing systems relies on the computing system being networked with (i.e., able to communicate messages with) other computing systems. In order for the two communicating computing systems to accomplish a particular task, a number of message exchanges may be needed.

There is often a predicable and expected pattern of message exchange between the two computing systems in order to accomplish a particular task. For example, in accordance with an arbitrary example message exchange pattern, a first computing system may transmit a first kind of message to the second computing system. In response, the second computing system may then return to the first computing system a second or third type of message. If the first computing system receives the second type of message from the second computing system, the first computing system may terminate message exchange. If the second computing system receives the third type of message from the second computing system, the first computing system may transmit a fourth type of message. The message exchanges continue predictably through the message exchange pattern until the message exchange pattern warrants cessation in further message exchanges. Of course, each computing system performs appropriate processing in response to each message receipt.

Accordingly, depending on progress through a message exchange pattern, it may be appropriate for a computing system to transmit some types of messages, but not others. However, some applications running on the computing system may request transmission of inappropriate messages anyway. Typically, the computing system would transmit the message anyway if the application so requested. This would likely result in an error message being returned by the other computing system involved in the message exchange. Alternatively, the other computing system may simply drop the invalid message since it does not know how to handle the invalid message in the context of current progress through the message exchange pattern.

The transmission of the invalid message (and potentially the return of the error message) results in wasted processing and network resources since nothing is actually accomplished towards furthering the goal enabled by the proper message exchange pattern. Furthermore, in message exchange patterns that are long term representing long-running activities, it may take some time for the computing system that transmitted the invalid message to realize that it committed an error, or to realize that the message exchange has terminated in a failed attempt at the goal.

Accordingly, what would be advantageous are mechanisms in which there is efficient message transmission between computing systems engaged in a message exchange pattern even if an application on one of the computing systems requests transmission of a message that is invalid for the message exchange pattern. Furthermore, it would be advantageous if the application requesting the invalid message transmission learned in a more timely fashion that the invalid message was not acceptable for the current progress in the message exchange pattern.

BRIEF SUMMARY OF THE INVENTION

The foregoing problems with the prior state of the art are overcome by the principles of the present invention, which are directed towards mechanisms for enforcing a message exchange pattern. When two computing systems communicate in order to accomplish a particular task, they engage in a particular message exchange pattern. Given certain progress through the message exchange pattern, the message exchange pattern may restrict which computing system may send what kind of messages for the transaction corresponding to the message exchange pattern. If each computing system enforces this message exchange pattern, the chance that messages that do not conform to the message exchange pattern (i.e., invalid messages) will be transmitted is substantially reduced.

Each computing system tracks progress through the message exchange pattern by, for example, using a state transition tree in which each node represents a state of the message exchange pattern, and in which transmission or receipt of certain messages may cause state transitions. A computing system then only transmits messages if appropriate given the current tracked progress through the message exchange pattern.

For example, upon detecting a request from a component to transmit a message to the other computing system involved in the message exchange pattern, the computing system determines whether or not the message is a valid message given the tracked progress through the message exchange pattern. If the message is a valid message, then the message is transmitted to the second computing system, and the state transition tree is transitioned to a different state if appropriate. On the other hand, if the message is not a valid message given the tracked progress through the message exchange pattern, then the component that originally made the request is notified of the error, and the message is not transmitted to the second computing system.

Since invalid messages are not transmitted, network bandwidth and processing resources are preserved. In long running message exchange patterns, state information for the message exchange pattern may be loaded from persistent memory to system memory when receiving messages (or when receiving a request to transmit a message). Furthermore, the state information may be saved from system memory to persistent memory after the received message is processed (or after the requested message transmission is complete). Accordingly, the transmission of invalid messages may result in the transfer of large amounts of information between persistent memory and system memory even though the invalid message results in no progress. This is avoided since invalid messages are never sent and are less likely received thereby resulting in considerable resource preservation for long running message exchange patterns.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
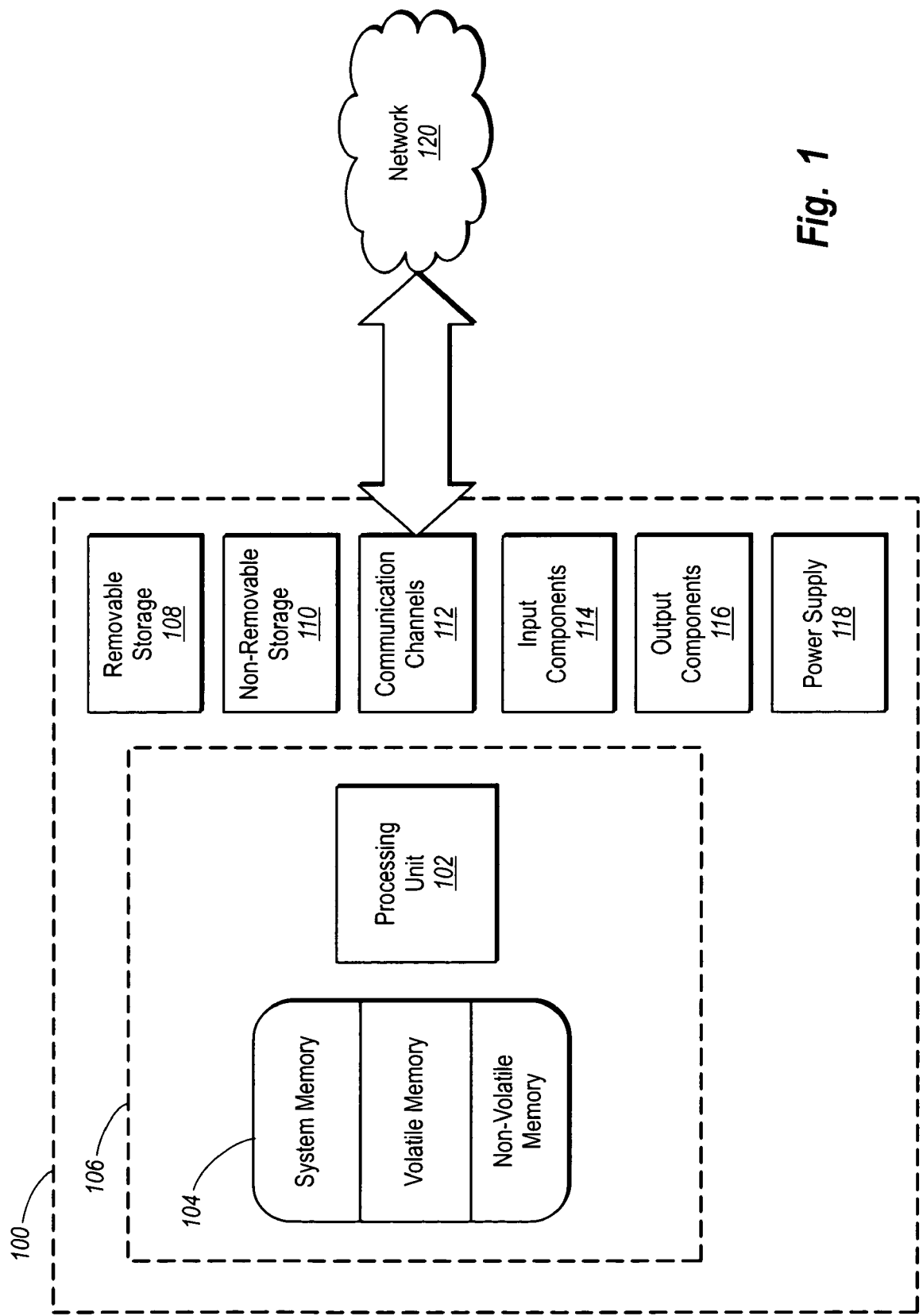
FIG. 1 illustrates a suitable computing system that may implement features of the present invention.

The principles of the present invention relate to mechanisms for enforcing a message exchange pattern. When two computing systems communicate in order to accomplish a particular task, they engage in a particular message exchange pattern. Given certain progress through the message exchange pattern, the message exchange pattern may restrict which computing system may send what kind of messages. Each computing system tracks progress through the message exchange pattern by, for example, using a state transition tree in which each node represents a state of the message exchange pattern, and in which transmission or receipt of certain messages may cause state transitions. A computing system then only transmits messages if appropriate given the current tracked progress through the message exchange pattern.

Turning to the drawings, wherein like reference numerals refer to like elements, the invention is illustrated as being implemented in a suitable computing environment. The following description is based on illustrated embodiments of the invention and should not be taken as limiting the invention with regard to alternative embodiments that are not explicitly described herein.

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that several of the acts and operations described hereinafter may also be implemented in hardware. FIG. 1 shows a schematic diagram of an example computer architecture usable for these devices.

For descriptive purposes, the architecture portrayed is only one example of a suitable environment and is not intended to suggest any limitation as to the scope of use or functionality of the invention. Neither should the computing systems be interpreted as having any dependency or requirement relating to anyone or combination of components illustrated in FIG. 1.

The invention is operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing system 100 typically includes at least one processing unit 102 and memory 104. The memory 104 may be volatile (such as RAM), non-volatile (such as ROM, flash memory, etc.), or some combination of the two. This most basic configuration is illustrated in FIG. 1 by the dashed line 106.

The storage media devices may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Computing system 100 may also contain communication channels 112 that allow the host to communicate with other systems and devices. Communication channels 112 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computing system 100 may also have input components 114 such as a keyboard, mouse, pen, a voice-input component, a touch-input device, and so forth. Output components 116 include screen displays, speakers, printer, etc., and rendering modules (often called "adapters") for driving them. The computing system 100 has a power supply 118. All these components are well known in the art and need not be discussed at length here.

Figure 2:
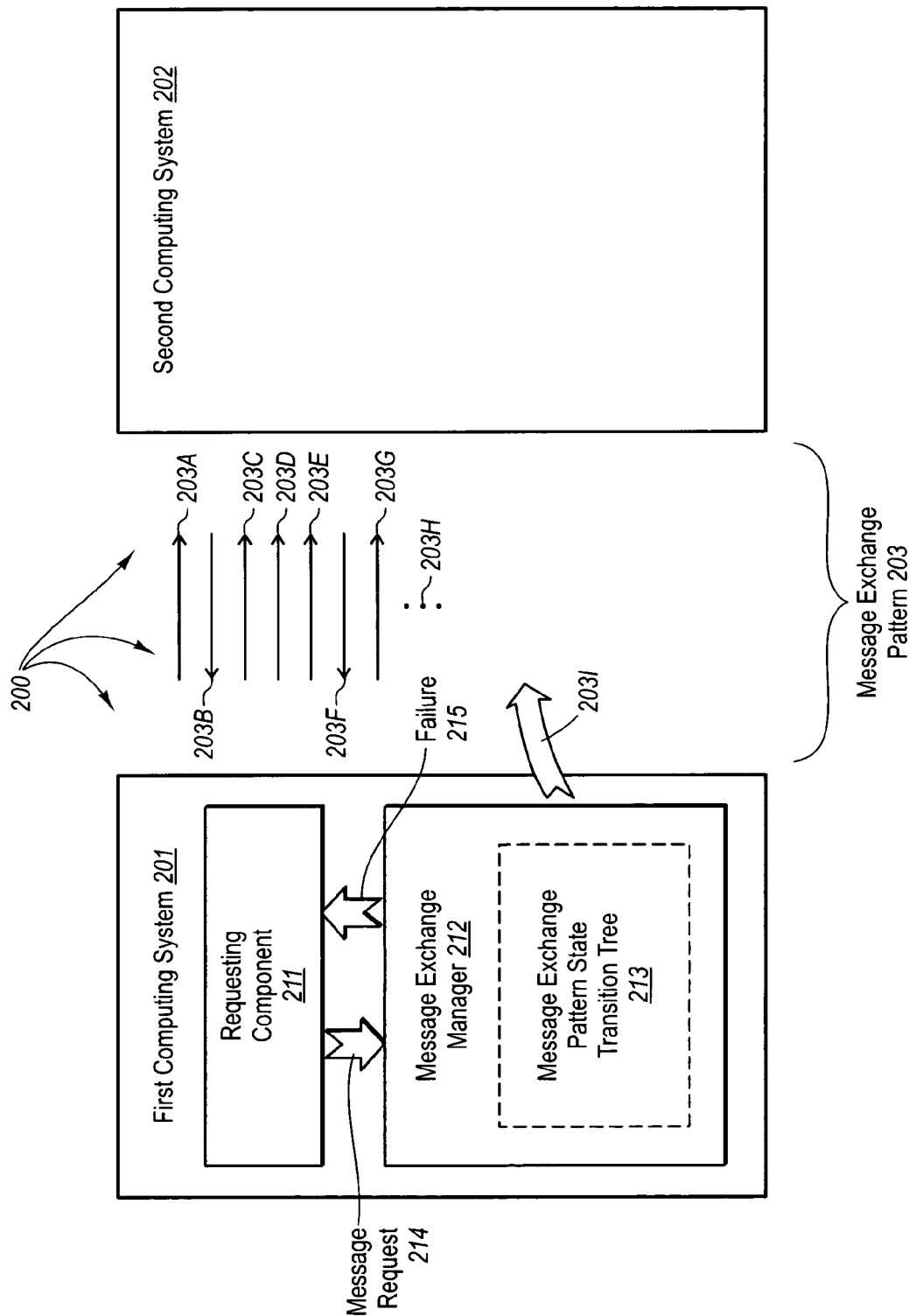
FIG. 2 illustrates a network environment in which the principles of the present invention may be employed including two computing systems engaged in a message exchange pattern, each computing system tracking progress of the message exchange pattern.

FIG. 2 illustrates a network environment 200 in which two computing systems communicate to accomplish a particular task. In particular, the first computing system 201 communicates with the second computing system 202. In order to accomplish the task, the computing systems exchange messages in a particular pattern of exchange. The particular pattern of message exchange defines which computing system is to send which message at any given point in the message exchange. The message exchange pattern depends on the task to be accomplished, and the protocols used to exchange messages. The principles of the present invention are not limited to any given structure for the message exchange pattern. As an example, in the illustrated embodiment, the message exchange pattern 203 includes message transmissions 203A through 203G amongst potentially others as represented by the vertical ellipses 203H.

The first requesting computing system 201 and the second computing system 202 may be structured as described above for the computing system although this is not required. In this description and in the claims, a "computing system" is defined as any device or system that has the capability to send, receive, and process electronic messages. Also, the use of the terms "first", "second" and so forth to modify an item is only intended to distinguish one item from another, and does not imply any sort of sequential ordering per se.

The first computing system 201 includes a requesting component 211 and a message exchange manager 212. The requesting component 211 request that messages be exchanged, while the message exchange manager 212 enforces the message exchange pattern so that only messages that are appropriate given the message exchange pattern are transmitted. The second computing system 202 may have similar components as those described herein as being contained by the first computing system 201.

There may be multiple possible message exchange patterns that the first computing system 201 is capable of employing, depending on the task to be accomplished. Accordingly, the first one or two messages between the first computing system 201 and the second computing system 202 may allow the two computing systems to agree on what message exchange pattern to use. In other cases, the message exchange pattern may be implicit. The message exchange that allowed the two computing systems to agree on a message exchange pattern may also be thought of as being a message exchange pattern.

The messages within the message exchange pattern need not all be generated and consumed by the same components in the computing system. For example, some message may be protocol level messages to allow for proper coordination at the protocol-level between the two computing systems. Other messages may be application level message to allow for the exchange of data needed to accomplish the desired task. In one embodiment, the protocol level messages in the message exchange pattern are governed by the Web Services Coordination (WS-Coordination) and WS-Transaction specifications, which are known to those of ordinary skill in the art.

Figure 3:
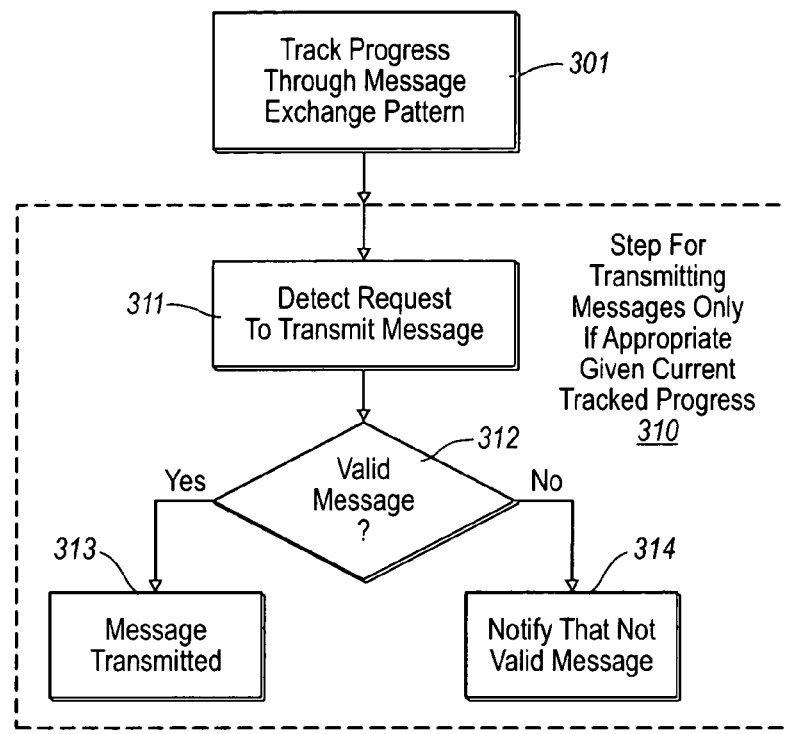
FIG. 3 illustrates a flowchart of a method for enforcing the message exchange pattern in accordance with the principles of the present invention.

FIG. 3 illustrates a flowchart of a method 300 for enforcing the message exchange pattern in accordance with the principles of the present invention. Either computing system 201 and 202 may perform the method 300 in order to enforce the message exchange pattern bi-directionally. However, the remainder of this description will focus on the message exchange pattern enforcement as performed by the first computing system 201.

Referring to FIG. 3, the computing system 201 tracks progress through the message exchange pattern (act 301). Thus, the computing system 201 is aware of where in the message exchange pattern the computing system 201 is. This may be accomplished by the computing system 201 maintaining a state transition tree representing the message exchange pattern. Referring to FIG. 2, the computing system 201 may use the message exchange manager 212 to maintain the message exchange pattern state transition tree 213. The message exchange pattern state transition tree 213 may be maintained in system memory. Alternatively or in addition, the state transition tree 213 may be durably stored in any persistent media such as, for example, magnetic disks.

The message exchange pattern state transition tree 213 includes nodes for each state in the message exchange pattern. For each node, there is provided a listing of valid message types and which computing system may send which types of messages. For each valid message type, there is also an identification of which state to transition to when receiving (or transmitting as the case may be) the specified message. The structure of the tree depends entirely on the message exchange pattern, which in turn depends on the task to be performed. Illustrating all possible state transition trees would be impossible due to the endless variety of message exchange patterns. Listing many would obscure the principles of the present invention. However, one message exchange pattern is described here for illustrative purposes only. Those of ordinary skill in the art will appreciate (after having read this description) that the principles of the present invention apply to any message exchange pattern.

Figure 4:
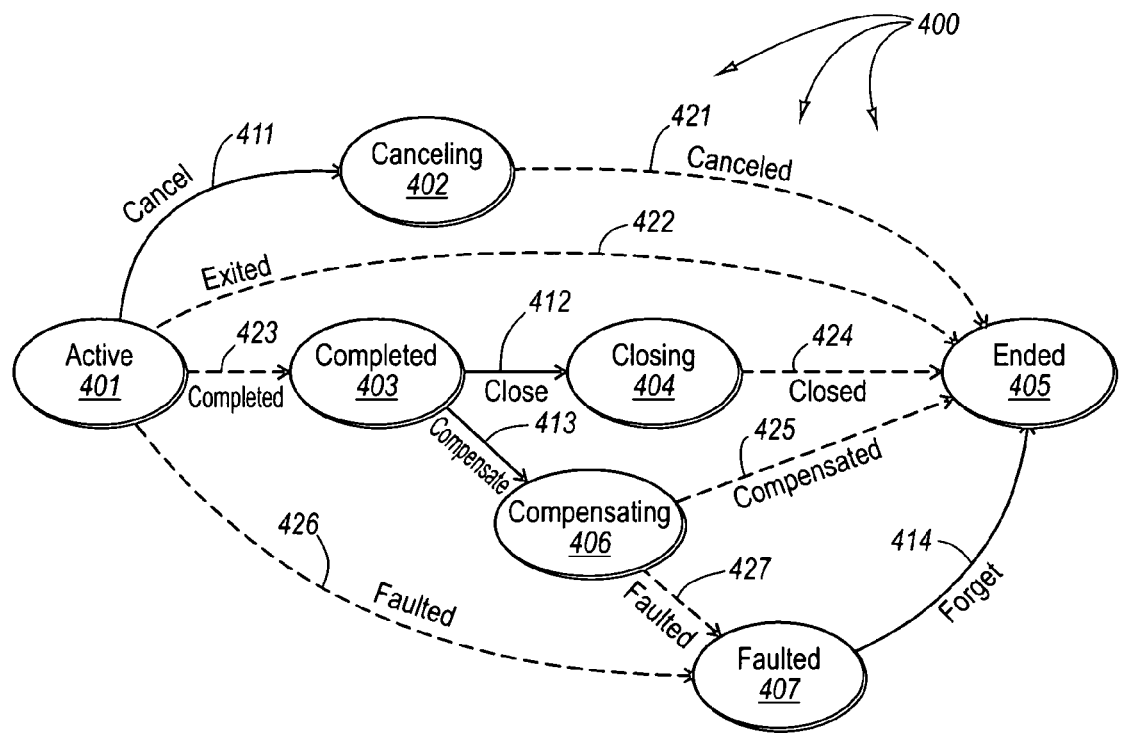
FIG. 4 illustrates a state transition tree that may be used to track progress in an arbitrary message exchange pattern.

That said, FIG. 4 illustrates an example message exchange pattern state transition tree 400. The state transition tree 400 includes a number of states 401 through 407. The transmission of messages from one of the computing systems results in state transitions represented by solid arrows. On the other hand, the transmission of messages from the other of the computing systems results in state transitions represented by dashed arrows. Referring to FIG. 4, one computing system transmits messages that result in state transitions 411 through 414, while the other computing system transmits messages that result in state transitions 421 through 427. Each arrow is associated with a particular message type or group of message types that are valid for that transition.

If WS Coordination is being used, the first computing system 201 may first send a coordination context message to the second computing system 202. The second computing system 202 then may send a registration message to the first computing system 201. The first computing system 201 then sends a registration receipt message to the second computing system 202. At this stage, the first computing system 201 takes on the role of "coordinator" and the second computing system 202 takes on the role of "participant", and the message exchange is in the active state 401. The solid lines in FIG. 4 represent state transitions caused by the coordinator (i.e., the first computing system 201) transmitting messages, while the dashed lines in FIG. 4 represent state transitions caused by the participant (i.e., the second computing system 202) transmitting messages.

From the active state 401, the first computing system 201 may transmit a cancel message to the second computing system 202. This represents that the first computing system 201 has chosen to cancel operations previously requested, and result in a transition from the active state 401 to the canceling state 402 as represented by the solid arrow 411. More generally, the transmitting computing system recognizes state transitions as soon as the message associated with the transition is transmitted. The receiving computing system recognizes state transitions as soon as the message associated with the transition is received Accordingly, there may be some transient differences in the tracked progress of the state transition chart as recognized by the first computing system 201, and the tracked progress of the state transition chart as recognized by the second computing system 202. In this specific transition 411, the first computing system 201 recognizes this transition 411 as soon as it transmits the cancel message. The second computing system 402 recognizes the transition 411 as soon as it receives the cancel message.

Alternatively, while in the active state 401, the first computing system 201 may receive an exited message from the second computing system 202. This informs the first computing system 201 that the second computing system 202 will no longer participate in the message exchange pattern. Accordingly, the transmission of the exited message from the second computing system 202 to the first computing system 201 results in a transition 422 from the active state 401 to an ended state 405.

Alternatively, while in the active state 401, the first computing system 201 may receive a completed message from the second computing system 202. This informs the first computing system 201 that the second computing system 202 has completed processing related to a previous request. Accordingly, the transmission of the completed message from the second computing system 202 to the first computing system 201 results in a transition 423 from the active state 401 to a completed state 403.

Alternatively, while in the active state 401, the first computing system 201 may receive a faulted message from the second computing system 202. This informs the first computing system 201 that the second computing system 202 has failed from the active state 401. Accordingly, the transmission of the faulted message from the second computing system 202 to the first computing system 201 results in a transition 426 from the active state 401 to a faulted state 407.

While in the canceling state 402, the first computing system 201 may receive a canceled message from the second computing system 202. This informs the first computing system 201 that the second computing system 202 acknowledges that the previously requested operation has been cancelled at the request of the first computing system 201. Accordingly, the transmission of the canceled message from the second computing system 202 to the first computing system 201 results in a transition 421 from the canceling state 402 to the ended state 405.

While in the completed state 403, the first computing system 201 may transmit a close message to the second computing system 202. This informs the second computing system 202 that the previous request was successful. Accordingly, the transmission of the close message from the first computing system 201 to the second computing system 202 results in a transition 412 from the completed state 403 to the closing state 404.

While in the closing state 404, the first computing system 201 may receive a closed message from the second computing system 202. This informs the first computing system 201 that the second computing system 202 has finalized the operation successfully. Accordingly, the transmission of the closed message from the second computing system 202 to the first computing system 201 results in a transition 424 from the closing state 404 to the ended state 405.

Also while in the completed state 403, the first computing system 201 may transmit a compensate message to the second computing system 202. This informs the second computing system 202 that the work being done should be undone to the extent reasonable. Accordingly, the transmission of the compensate message from the first computing system 201 to the second computing system 202 results in a transition 413 from the completed state 403 to the compensating state 406

While in the compensating state 406, the first computing system 201 may receive a compensated message from the second computing system 202. This informs the first computing system 202 that the compensation action was successful. Accordingly, the transmission of the compensated message from the second computing system 202 to the first computing system 201 results in a transition 425 from the compensating state 406 to the ended state 405.

Alternatively, while in the compensating state 406, the first computing system 201 may receive a faulted message from the second computing system 202. This informs the first computing system 201 that the second computing system 202 has failed from the compensating state 406. Accordingly, the transmission of the faulted message from the second computing system 202 to the first computing system 201 results in a transition 427 from the compensating state 406 to a faulted state 407.

While in the faulted state 407, the first computing system 201 may transmit a forget message to the second computing system 202. This informs the second computing system 202 that the first computing system 201 is aware of the fault. Accordingly, the transmission of the forget message from the first computing system 201 to the second computing system 202 results in a transition 414 from the faulted state 407 to the ended state 405.

Although this message exchange pattern is a mere example, it has been described in some detail so that the example may be used to understand the principles of the present invention. Specifically, returning to FIG. 3, while tracking progress through the message exchange pattern using, for example, the message exchange pattern state transition tree 400 of FIG. 4, the first computing system 201 performs a functional, result-oriented step for transmitting messages only if appropriate given the current tracked progress through the message exchange pattern (step 310). This step 310 includes any corresponding acts that accomplish this result. However, in the illustrated embodiment, step 310 includes corresponding acts 311 through 314, which may be repeated each time a message transmission request is detected.

The first computing system detects a request from a component to transmit a message to the second computing system (act 311). In FIG. 2, this request is represented by the requesting component 211 sending a message request 214 to the message exchange manager 212. The message may be a HyperText Transport Protocol (HTTP) message, a Simple Object Access Protocol (SOAP) message, an RMI invocation used in Java environments, or any other kind of message. If a SOAP message is used, the specific type of the message may be specified in a SOAP header of the message.

The first computing system then determines whether the message is a valid message given the tracked progress through the message exchange pattern (decision block 312). This may be determined by the message exchange manager 212 by using a state transition tree 213 such as the message exchange pattern state transition tree 400 of FIG. 4. For example, while in the active state 401, the only valid message for the first computing system to transmit is a cancel message. While in the completed state 403, the first computing system may validly transmit either a close or a compensate message. While in the faulted state 407, the first computing system may only validly transmit a forget message. While in the canceling state 402, closing state 404 or compensating state 406, the first computing system may not validly transmit any message related to the message exchange pattern. The type of message may be identified from the structure of the message itself. For example, if the messages contain SOAP envelopes, a SOAP header may specify the type of message. The state transition tree 213 may not only be used to validate messages that are requested to be transmitted, but may also be used to validate received messages.

If the message is determined to be a valid message given the tracked progress through the message exchange pattern (the YES branch in decision block 312), then the message is transmitted to the second computing system (act 313). Referring to FIG. 2, this is represented by the first computing system transmitting a message 203I to the second computing system. The message 203I will be part of the message exchange pattern 203 due to the message exchange pattern enforcement.

If the message is determined to be an invalid message given the tracked progress through the message exchange pattern (the NO branch in decision block 312), then the requesting component is notified that the message is not a valid message (act 314) and the message is not sent. Referring to FIG. 2, this is represented by the message exchange manager 212 sending a failure notification 215 to the requesting component 211. The requesting component 211 may be an application or any other component in the computing system 201.

Since invalid messages are not transmitted, network bandwidth and processing resources are preserved. In long running message exchange patterns, state information for the message exchange pattern may be loaded from persistent memory (i.e., loaded from durable state) to system memory, and saved from system memory to persistent memory (i.e., to durable state) in response to receiving messages. Accordingly, the transmission of invalid message may result in the transfer of large amounts of information between persistent memory and system memory even though the invalid message results in no progress. This is avoided since invalid messages are never sent thereby resulting in considerable resource preservation for long running message exchange patterns.

Figure 5:
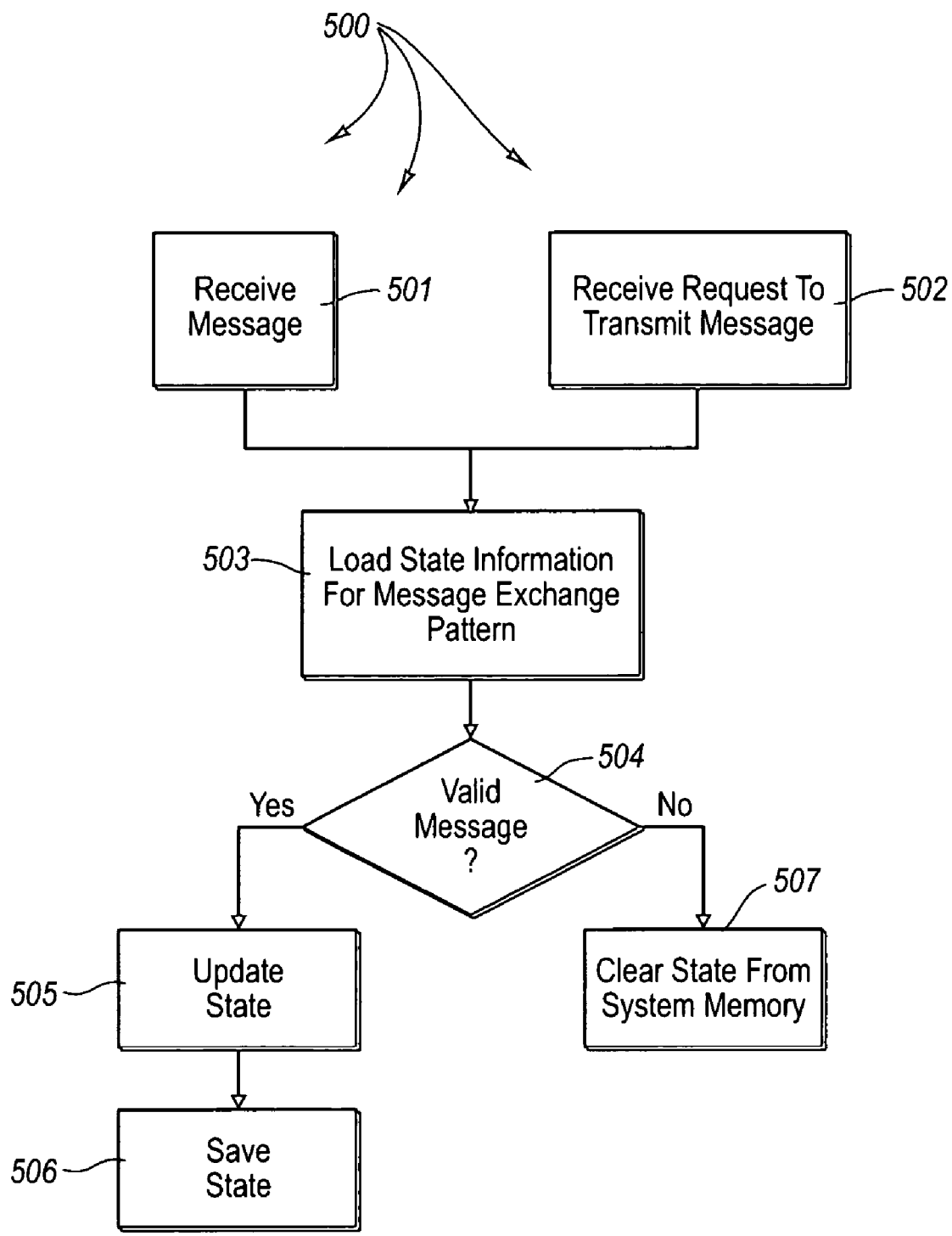
FIG. 5 illustrates a method for persistently tracking message exchange pattern state.

FIG. 5 illustrates a method 500 for persistently tracking message exchange pattern state in the case of long running message exchange patterns. In response to receiving a message (act 501) from another computing system involved in the message exchange pattern, or in response to receiving a request to transmit a message to that other computing system (act 502), the computing system loads state information related to the message exchange pattern from persistent memory to system memory (act 503).

If the message is a valid message, (the YES branch in decision block 504), then the state information is updated to reflect the transmission of the request (act 505), and the updated state information is saved to persistent memory (act 506). Optionally, a copy of the state information (or a portion thereof) may remain in system memory for at least a short time after it is saved to persistent memory. If the message is an invalid message (the NO branch in decision block 504), then system memory may optionally be cleared of the state information upon notifying the component that the message is not a valid message (act 507).

This large scale transfer between persistent memory and system memory is important in long running transactions because there may be many events that occur during the lifetime of the transaction that rely on the state information being persisted. For example, there may be numerous system failures or software changes that occur during the transaction. While persisting state is beneficial for long running transactions, it is processing intensive. Accordingly, by transmitting messages only when they are valid for a long running message exchange pattern, one avoids unnecessarily performing the large scale transfer of memory between persistent memory and system memory, thereby significantly preserving processing resources.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a computing system for communicating messages in a message exchange pattern that defines whether a message is valid or invalid based on a current state of the message exchange pattern, a method for enforcing the message exchange pattern by restricting the transmission of invalid messages which do not conform to the current state of the message pattern, so as to preserve network bandwidth and processing resources, the method comprising:

storing a state transition tree for the message exchange pattern in which each node of the tree represents a state of the message exchange pattern and in which a transmission or a receipt of a message causes a state transition to an appropriate next node in the tree;

tracking progress through the message exchange pattern by performing the following, at a current node in the state transition tree, detecting a request to transmit a message at the computing system;

detecting a request from a component at the computing system to transmit a message to a second computing system; and loading state information related to the message exchange pattern from persistent memory to system memory in response to detecting a request to transmit the message to the second computing system;

based on the current state in the message exchange pattern, determining whether the request to transmit the message renders the message valid or invalid;

when the message is determined to be a valid message given the current node, transmitting the message, and then updating the state information to represent the transmission of the message to the second computing system upon transmitting the message to the second computing system;

transitioning the node to the appropriate next node in the tree; and saving the updated state information; and when it is determined that the message is not a valid message to be sent given the current node in the tree, preventing the transmission of the message and notifying the component that the message is not a valid message.

2. A method in accordance with claim 1, wherein the message is a HyperText Transport Protocol (HTTP) message.

3. A method in accordance with claim 1, wherein the message is a Simple Object Access Protocol (SOAP) message.

4. A method in accordance with claim 3, wherein a type of message is specified in a SOAP header of the message, wherein determining whether the request to transmit the message renders the message valid or invalid comprises:

reading the SOAP header of the message.

5. A method in accordance with claim 1, wherein the message is an RMI invocation.

6. A method in accordance with claim 1, wherein the message is a first message, the method further comprises:

detecting a request from a component to transmit a second message to the second computing system;

determining that the second message is a valid message based on the current state in the message exchange pattern; and transmitting the second message to the second computing system.

7. A method in accordance with claim 6, further comprising:

identifying a role of the computing system in the message exchange pattern, wherein determining that the second message is a valid message is performed in light of the identified role.

8. A method in accordance with claim 1, further comprising:

loading state information related to the message exchange pattern from persistent memory to system memory in response to detecting a request to transmit the first message to the second computing system.

9. A method in accordance with claim 8, further comprising:

clearing system memory of the updated state information upon notifying the component that the message is not a valid message.

10. A method in accordance with claim 1, wherein the message exchange pattern includes a plurality of application layer messages.

11. A method in accordance with claim 10, wherein the message exchange pattern includes a plurality of protocol layer messages.

12. A method in accordance with claim 1, wherein the message exchange pattern includes a plurality of protocol layer messages.

13. A method in accordance with claim 1, wherein the message exchange pattern includes the transmission of one or more messages in which the message exchange pattern is identified and agreed to between the computing system and the second computing system.

14. A method in accordance with claim 1, further comprising:

identifying a role of the computing system in the message exchange pattern, wherein determining that the message is not a valid message is performed in light of the identified role.

15. A computer program product for use in computing system capable of communicating messages in a message exchange pattern that defines whether a message is valid or invalid based on a current state of the message pattern, the computer program product for performing a method for enforcing the message exchange pattern by restricting the transmission of invalid messages which do not conform to the current state of the message pattern so as to preserve network bandwidth and processing resources, the computer program product comprising one or more computer-readable storage media having thereon computer-executable instructions which, when executed by one or more processors of the computing system, cause the computing system to perform the method of claim 1.

16. A computer program product in accordance with claim 15, wherein the one or more computer-readable storage media includes system memory.

17. A computer program product in accordance with claim 15, wherein the one or more computer-readable storage media includes persistent memory.

18. A computer program product in accordance with claim 17, wherein the persistent memory is a magnetic disk.

19. A computer program product in accordance with claim 15, wherein a state transition from a first state to a second state, occurs upon the transmission or receipt of one or more valid messages for the first state.

20. A computer program product in accordance with claim 15, wherein the message is a HyperText Transport Protocol (HTTP) message.

21. A computer program product in accordance with claim 15, wherein the message is a Simple Object Access Protocol (SOAP) message.

22. A computer program product in accordance with claim 21, wherein a type of message is specified in a SOAP header of the message, wherein determining whether the request to transmit the message renders the message valid or invalid comprises:

reading the SOAP header of the message.

23. A computer program product in accordance with claim 15, wherein the message is an RMI invocation.

24. A computer program product in accordance with claim 15, wherein the message is a first message, the method further comprising:

detecting a request from a component to transmit a second message to the second computing system;

determining that the second message is a valid message based on the current state in the message exchange pattern; and transmitting the second message to the second computing system.

25. A computer program product in accordance with claim 24, wherein the one or more computer-readable storage media further have thereon computer-executable instructions that, when executed by the one or more processors, cause the computing system to perform:

identifying a role of the computing system in the message exchange pattern, wherein determining that the second message is a valid message is performed in light of the identified role.

26. A computer program product in accordance with claim 15, further comprising the following:

an act of loading state information related to the message exchange pattern from persistent memory to system memory in response to the act of detecting a request to transmit the first message to the second computing system.

27. A computer program product in accordance with claim 26, further comprising the following:

an act of clearing system memory of the updated state information upon the act of notifying the component that the message is not a valid message.

28. A computer program product in accordance with claim 15, wherein the one or more computer-readable storage media further have thereon computer-executable instructions that, when executed by the one or more processors, cause the computing system to perform:

an act of identifying a role of the computing system in the message exchange pattern, wherein determining whether the request to transmit the message renders the message valid or invalid is performed in light of the identified role.

* * * * *